United States Patent
Tokuchi et al.

(10) Patent No.: US 10,949,521 B2
(45) Date of Patent: Mar. 16, 2021

(54) INFORMATION PROCESSING SYSTEM

(71) Applicant: FUJI XEROX CO., LTD., Tokyo (JP)

(72) Inventors: Kengo Tokuchi, Kanagawa (JP); Yukari Sai, Tokyo (JP); Mizuha Marumoto, Tokyo (JP); Yuka Nomura, Kanagawa (JP); Yukiko Miyakoshi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 270 days.

(21) Appl. No.: 16/114,978

(22) Filed: Aug. 28, 2018

(65) Prior Publication Data

US 2019/0243958 A1    Aug. 8, 2019

(30) Foreign Application Priority Data

Feb. 2, 2018    (JP) .............................. JP2018-017268

(51) Int. Cl.
  *G06F 21/60*    (2013.01)
  *G06F 21/35*    (2013.01)
  *G06F 21/32*    (2013.01)

(52) U.S. Cl.
  CPC .............. *G06F 21/35* (2013.01); *G06F 21/32* (2013.01); *G06F 21/604* (2013.01)

(58) Field of Classification Search
  CPC ......... G06F 21/35; G06F 21/32; G06F 21/604
  See application file for complete search history.

(56) References Cited

U.S. PATENT DOCUMENTS

| | | | |
|---|---|---|---|
| 2015/0035656 A1* | 2/2015 | Franz ..................... | G08C 23/04 340/12.5 |
| 2017/0215736 A1 | 8/2017 | Hu | |
| 2018/0052982 A1* | 2/2018 | Kingsbury .......... | G06F 21/6218 |
| 2018/0097641 A1* | 4/2018 | Byrne ....................... | H02J 1/00 |
| 2019/0080069 A1* | 3/2019 | Sato ....................... | G09B 19/14 |

FOREIGN PATENT DOCUMENTS

JP    2017-23475 A    2/2017

* cited by examiner

*Primary Examiner* — Alexander Lagor
*Assistant Examiner* — Vu V Tran
(74) *Attorney, Agent, or Firm* — Oliff PLC

(57) ABSTRACT

An information processing system includes a portable sheet having a first face and a second face, a sensing unit that senses a physical quantity acting on the first face and a physical quantity acting on the second face, and a controller that executes a control based on a combination of physical quantities, the combination of physical quantities being a combination of the sensed physical quantity acting on the first face and the sensed physical quantity acting on the second face.

9 Claims, 7 Drawing Sheets

FIG. 5

| REGISTERED DISTRIBUTION CHARACTERISTICS DATA | CONTROL MODE |
|---|---|
| CHARACTERISTICS A | OFFICE |
| CHARACTERISTICS B | OFFICE |
| CHARACTERISTICS C | OUTSIDE |
| CHARACTERISTICS D | OUTSIDE |

INFORMATION PROCESSING SYSTEM

CROSS-REFERENCE TO RELATED APPLICATIONS

This application is based on and claims priority under 35 USC 119 from Japanese Patent Application No. 2018-017268 filed Feb. 2, 2018.

BACKGROUND

Technical Field

The present invention relates to an information processing system.

SUMMARY

According to an aspect of the invention, there is provided an information processing system including a portable sheet having a first face and a second face, a sensing unit that senses a physical quantity acting on the first face and a physical quantity acting on the second face, and a controller that executes a control based on a combination of physical quantities, the combination of physical quantities being a combination of the sensed physical quantity acting on the first face and the sensed physical quantity acting on the second face.

BRIEF DESCRIPTION OF THE DRAWINGS

Exemplary embodiment of the present invention will be described in detail based on the following figures, wherein:

FIG. 5 illustrates exemplary mode settings information;

DETAILED DESCRIPTION

An example of a sheet-shaped apparatus 100 according to an exemplary embodiment will be described below with reference to FIGS. 1 and 2.

Figure 1:
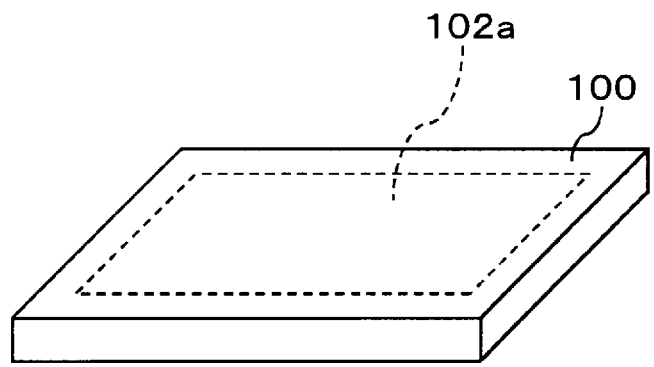
FIG. 1 schematically illustrates the outward appearance of a sheet-shaped apparatus (in the form of a cushion)

In the example illustrated in FIG. 1, the sheet-shaped apparatus 100 is implemented as, for example, a cushion placed on a seat such as a chair. Although the sheet-shaped apparatus 100 has a rectangular top face in FIG. 1, this is intended to be illustrative only. The sheet-shaped apparatus 100 may have a top face in another shape.

Figure 2:
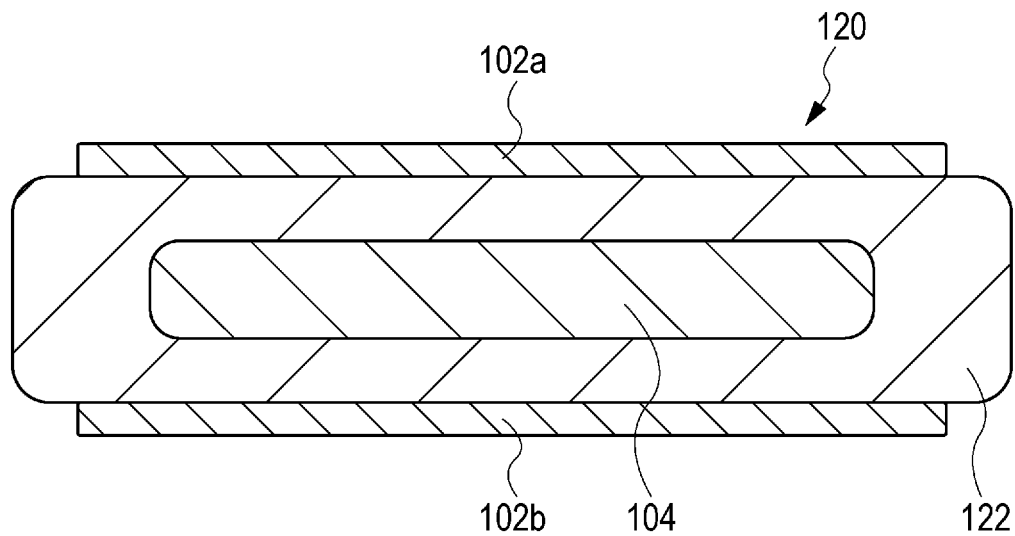
FIG. 2 schematically illustrates the cross-sectional structure of a sheet-shaped apparatus.

FIG. 2 illustrates a body portion 120 of the sheet-shaped apparatus 100. The body portion 120 has a sheet-shaped pressure distribution sensor 102a and a sheet-shaped pressure distribution sensor 102b respectively attached to the front and back sides of a base 122 equipped with a heater 104. Although the present example assumes for convenience that the pressure distribution sensor 102a is disposed on the front side of the sheet-shaped apparatus 100 and the pressure distribution sensor 102b is disposed on the back side, no such distinction between the front and back sides may be made for the sheet-shaped apparatus 100 itself, and the sheet-shaped apparatus 100 may be placed with whichever side facing up. The heater 104 is an apparatus that converts supplied electricity into heat to generate heat. The heater 104 heats the buttocks, thighs, or other body parts of the user of the sheet-shaped apparatus 100. The base 122 is a plate-shaped member made of a material having a certain degree of flexibility, such as urethane. The heater 104 is, for example, fit into a hole provided in the base 122. The pressure distribution sensors 102a and 102b, which are sensors used to measure in-plane pressure distribution, have a generally flexible structure.

In addition to the above-mentioned components, the following components are built in the body portion 120: a controller 110 (see FIG. 3) including components such as a processor, a random access memory (RAM), a read-only memory (ROM), and a writable non-volatile storage medium; various sensors such as a temperature sensor, a humidity sensor, a location sensor using a GPS or other positioning systems, and a sensor according to related art that employs an optical fiber array arranged in a sheet-shaped configuration (to be referred to as "sensor sheet" hereinafter); a power supply circuit, a built-in battery, or other power supplies used to supply electricity to the above-mentioned pieces of electrical equipment; and wires between the above-mentioned pieces of electrical equipment.

The sheet-shaped apparatus 100 is formed by covering the body portion 120 with a covering (not illustrated). The covering may be made from, for example, a piece of fabric made by weaving or knitting of natural fibers, such as wool, chemical fibers, or other fibers. The covering may be removable from the body portion 120 so that when, for example, the covering becomes soiled or dirty, the covering may be detached from the body portion 120 for washing.

As described above, the base 122, which has a certain degree of hardness and serves as a cushioning material, is interposed between the pressure distribution sensors 102a and 102b. Accordingly, when the user places the sheet-shaped apparatus 100 on a seat and sits on the sheet-shaped apparatus 100, the pressure distribution sensor 102a or 102b (to be generically referred to as "pressure distribution sensor 102" hereinafter) located on the side of the sheet-shaped apparatus 100 closer to the user's body (e.g., the buttocks) (to be referred to as "body side" hereinafter), and the pressure distribution sensor 102b or 102a located on the side of the sheet-shaped apparatus 100 closer to the seating surface of the seat (to be referred to as "seat side" hereinafter) sense different pressure distributions at this time. In each case when the user places the sheet-shaped apparatus 100 on the same seat and sits in the seat, the pressure distribution sensed by the pressure distribution sensor 102 disposed on the body side falls within a certain range, although some variations may occur due to slight differences in sitting posture for individual occasions when the user sits in the seat, and likewise, the pressure distribution sensed by the pressure distribution sensor 102 disposed on the seat side falls within a certain range (e.g., assuming that the user sits back in the seat with correct posture in each compared case). Therefore, for the same user sitting in the same seat, the combination of the body-side and seat-side pressure distributions acting on the sheet-shaped apparatus falls within a certain range. Now, a case is considered in which the same user carries the sheet-shaped apparatus 100, and uses the sheet-shaped apparatus 100 by placing the sheet-shaped apparatus 100 on various seats in various places. In this case, if the material of the seating portion of a seat that the user sits on or the shape of the seating surface of the seat changes, both the pressure distribution sensed by the pressure distribution sensor 102 disposed on the body side and the pressure distribution sensed by the pressure distribution sensor 102 disposed on the seat side also change, and so does the combination of pressure distributions on the two sides. Since each person differs in weight or in the skeletal structure or fleshiness of his or her buttocks, a different person sitting on the same sheet-shaped apparatus 100 placed on the same seat causes both the pressure distribution sensed by the the pressure distribution sensor 102 disposed on the body side and the pressure distribution sensed by the pressure distribution sensor 102 disposed on the seat side to change, which also causes the combination of the two pressure distributions to change.

As described above, a combination of a pressure distribution sensed by the the pressure distribution sensor 102 disposed on the body side and a pressure distribution sensed by the pressure distribution sensor 102 disposed on the seat side may be used as identification information that uniquely identifies a user-seat combination.

Figure 3:
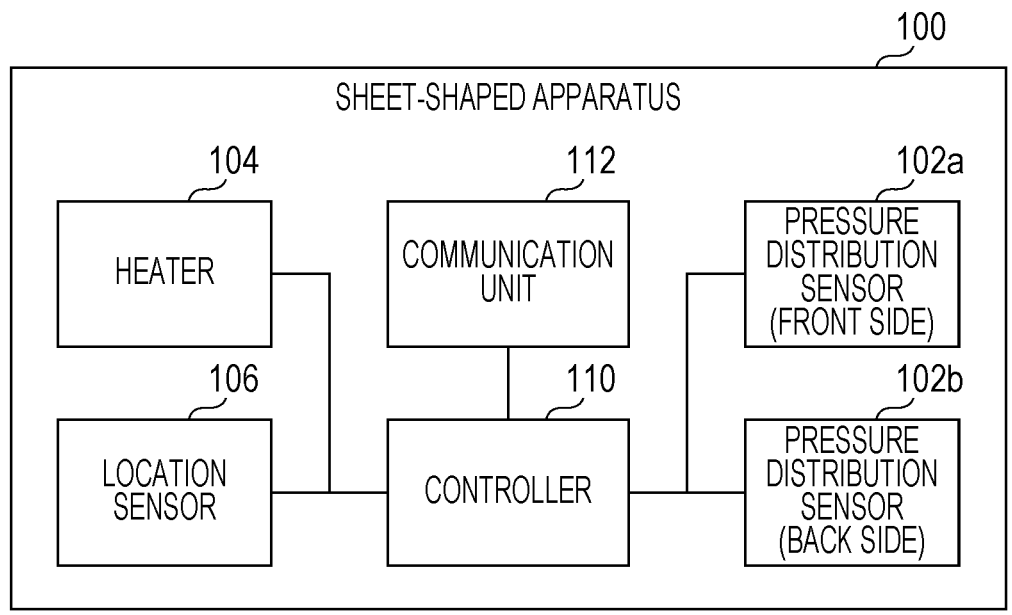
FIG. 3 illustrates the functional configuration of a sheet-shaped apparatus.

Next, an exemplary electrical functional configuration of the sheet-shaped apparatus 100 will be described with reference to FIG. 3. In the example illustrated in FIG. 3, the sheet-shaped apparatus 100 includes the pressure distribution sensors 102a and 102b, a group of the heaters 104, a location sensor 106, the controller 110, and a communication unit 112. The pressure distribution sensors 102a and 102b and the heaters 104 have already been described above.

The location sensor 106 measures the current location of the location sensor 106 (i.e., the current location of the sheet-shaped apparatus 100) by use of a positioning system such as a GPS. In one example, the sheet-shaped apparatus 100 may not be provided with the location sensor 106, and location information sensed by a location sensor (such as a GPS) of a user terminal 200 that is communicating with the sheet-shaped apparatus 100 by means of a short-range communication system may be used as location information of the sheet-shaped apparatus 100. In another example, the sheet-shaped apparatus 100 may include a sensor other than those illustrated in FIG. 3. For example, the sheet-shaped apparatus 100 may include a sensor such as a temperature sensor, a humidity sensor, an acceleration sensor, or an illuminance sensor.

The controller 110 receives individual pieces of sensing data from the above-mentioned sensors, and processes the pieces of sensing data. Examples of processes executed by the controller 110 may include a process that transmits a group of pieces of such sensing data to the user terminal 200 or to a server on a network via the communication unit 112. The controller 110 may analyze sensing data acquired from the group of sensors to obtain analysis results. The controller 110 may execute, as an example of this analysis, a process that determines whether a combination of pressure distributions sensed by the pressure distribution sensors 102a and 102b disposed on the front and back sides matches a pre-set combination (details of this process will be described later). The controller 110 may control the operation of the sheet-shaped apparatus 100 itself in accordance with the result of this determination. For example, the controller 110 may, in accordance with the result of the determination, control various units located inside the sheet-shaped apparatus 100, such as the heater 104, or select, from among pieces of sensing data obtained by the group of sensors located inside the sheet-shaped apparatus 100, which data is to be transmitted to the user terminal 200 or to the server.

The communication unit 112 is used to perform data communications that comply with a given communication standard. In one example, the communication unit 112 communicates with the user terminal 200 (a smart phone, a tablet terminal, or a personal computer) or other apparatuses in accordance with a predetermined short-range communication standard. Examples of short-range communication standards used in this case include wireless communication standards targeted for personal area (e.g., within a range of several tens centimeters to several meters) networking, such as Bluetooth (registered trademark), zigbee (trademark), and z-wave (trademark). In the present example, the communication unit 112 sends, under control by the controller 110, sensor information acquired by the above-mentioned group of sensors to the user terminal 200. Alternatively, sensing data from the sensors may be transmitted to the server via the user terminal 200. In another example, the communication unit 112 may transmit sensing data from the group of sensors to the server "directly" without via the user terminal 200, by use of standards that allow wide-area communication, such as cellular phone standards and various communication standards (e.g., LoRA or SIGFOX) classified as low power wide area (LPWA). Examples of "direct" transmissions in this case include transmissions made via a relay apparatus that complies with the same standards as mentioned above.

Figure 4:
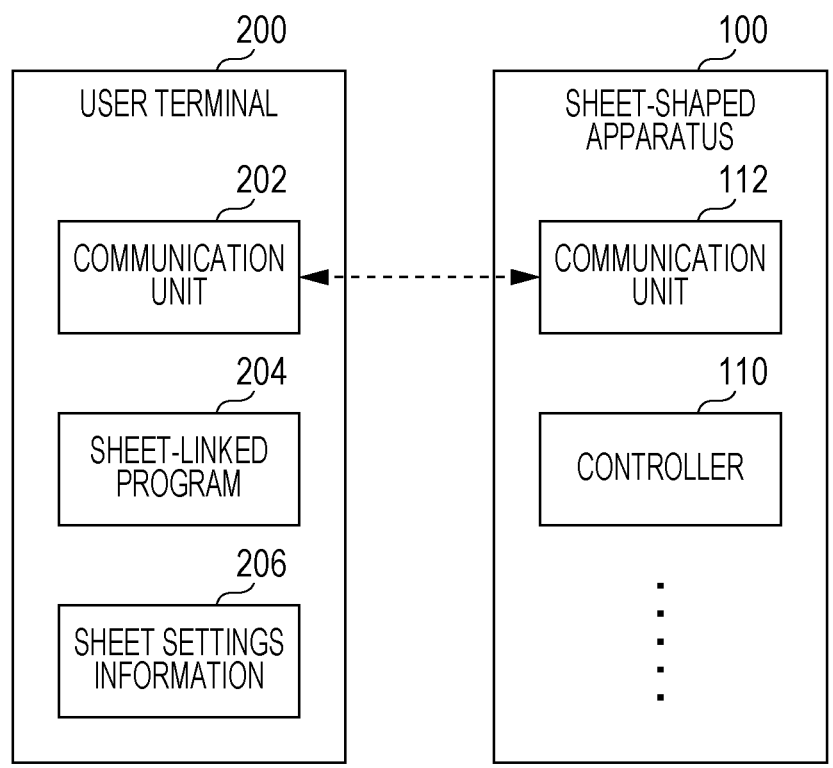
FIG. 4 illustrates the functional configuration of a system including a sheet-shaped apparatus and a user terminal.

Next, an exemplary system configuration according to the exemplary embodiment will be described with reference to FIG. 4. The sheet-shaped apparatus 100 is used by a user who sits in a seat. The sheet-shaped apparatus 100 is capable of communicating with the user terminal 200 used by the user, via the communication unit 112.

The user terminal 200 is an apparatus with built-in computer that is used by the user. The user terminal 200 may be an apparatus that can be carried by the user, such as a smart phone, a tablet terminal, or a notebook personal computer (PC), or may be an apparatus that is generally placed in a fixed place, such as a desktop PC. The user terminal 200 includes a communication unit 202. In the example illustrated in FIG. 4, the communication unit 202 enables the user terminal 200 to communicate with the communication unit 112 of the sheet-shaped apparatus 100 by means of, for example, a short-range communication system. The user terminal 200 is installed with a sheet-linked program 204. The sheet-linked program 204 is a program used for purposes such as to control the sheet-shaped apparatus 100, control the user terminal by use of the sheet-shaped apparatus 100, and provide information services by use of the sheet-shaped apparatus 100.

Sheet settings information 206 may be stored in a (e.g., writable or rewritable) non-volatile memory of the user terminal 200. The sheet settings information 206 represents settings information on the sheet-shaped apparatus 100 possessed by the user. The sheet settings information 206 includes mode settings information illustrated in FIG. 5, which represents the relationship between registered distribution characteristics data and control mode.

Distribution characteristics data refers to data representing the characteristics of a combination of pressure distributions that are sensed by the pressure distribution sensors 102a and 102b when the user places the sheet-shaped apparatus 100 on a given seat and sits on the sheet-shaped apparatus 100 with correct posture. An example of "characteristics of a combination" in this case may be, for example, a pair of pieces of pressure distribution data sensed by the pressure distribution sensors 102a and 102b. Instead of pressure distributions themselves, characteristics of the shape of such pressure distributions (which can be regarded as chevron-shaped curves like contour lines), such as the positions of peaks, the positional relationship between peaks, and the relationship between peak positions and ridges may be determined, and a combination of such characteristics for both the front and back sides of the sheet-shaped apparatus 100 may be used as distribution characteristics data.

Registered distribution characteristics data refers to distribution characteristics data registered in the mode settings information. When the user is to register a seat frequently used by the user himself or herself into the mode settings information, the user places the sheet-shaped apparatus 100 on the seat and then sits on the sheet-shaped apparatus 100 to thereby generate registered distribution characteristics data from the combination of pressure distributions obtained from the pressure distribution sensors 102a and 102b at that time. In another example, the user may sit in the same seat multiple times, and for each of the body side and the seat side, statistical processing may be performed on the pressure distribution data acquired each time the user sits in the seat, so that the combination of possible ranges of the body-side and seat-side pressure distributions sensed when the user sits in the seat, or a typical pressure distribution (e.g., the mean pressure distribution) on each of the body side and the seat side is determined and used as registered distribution characteristics data. Registered distribution characteristics data is obtained for each seat that the user frequently sits in, such as the user's own seat in an office, a chair placed in a meeting room, a chair in an in-house cafeteria, or a sofa in a cafe near the user's company. The registered distribution characteristics data thus obtained is registered into the mode settings information.

For example, when the user instructs that a seat registration process be executed on the sheet-linked program 204 of the user terminal 200, the sheet-linked program 204 displays a screen indicating to the user how to place the sheet-shaped apparatus 100 on the seat (e.g., information such as which side of the sheet-shaped apparatus 100 is to face up) or how to sit correctly on the sheet-shaped apparatus 100, and gives a prompt prompting the user to sit as indicated by the screen. Distribution characteristics data is obtained from the body-side pressure distribution data and the seat-side pressure distribution data that are sent from the sheet-shaped apparatus 100 when the user sits on the sheet-shaped apparatus 100, and the obtained distribution characteristics data is registered into the sheet settings information 206. At this time, if the direction of gravity is sensed by an acceleration sensor built in the sheet-shaped apparatus 100, and information indicative of the direction is sent to the user terminal 200, the sheet-linked program 204 is able to identify which one of the pressure distributions on two sides of the sheet-shaped apparatus 100 acquired from the sheet-shaped apparatus 100 corresponds to the top side (body side) and which one corresponds to the underside.

A control mode refers to a mode of controlling the operation of the user terminal 200 corresponding to distribution characteristics data. If a pair of pressure distributions sensed by the pressure distribution sensors 102a and 102b when the user sits in the seat on which the sheet-shaped apparatus 100 is placed matches any distribution characteristics data included in the mode settings information, operation of the user terminal 200 is controlled in accordance with the control mode corresponding to the distribution characteristics data.

For instance, if the user terminal 200 is a portable terminal such as a smart phone or a notebook PC, the user may sometimes sit in various seats when using the user terminal 200, such as the user's own seat in an office where the user works, or a sofa at a cafe located outside the user's office and frequently visited by the user. Such cases are common when, for example, the user uses his or her personally owned notebook PC to also perform business tasks for the company that the user works for. In this regard, it is often the case that due to the information security policy enforced by the company that the user works for, use of the user terminal 200 outside the company is not allowed, or use of the user terminal 200 outside the company is allowed but subject to restrictions such that the user is not allowed to execute a specific business-related application, the user is not allowed to open a specific business-related file within the user terminal 200, or the user is not allowed to access and use a specific function or specific piece of data within the company's in-house system from the user terminal 200. Accordingly, there is a need to switch the behaviors of the user terminal 200 in accordance with the type of a place where the user terminal 200 is being used by the user. In one aspect, the system according to the exemplary embodiment determines the type of a place where the user terminal 200 is being used by the user, from a combination of pressure distributions on both the front and back sides of the sheet-shaped apparatus 100 that the user carries and places on a seat, and switches the control modes used for controlling the operation of the user terminal 200, in accordance with the determined type of the place.

For example, distribution characteristics data may be acquired for several seats (e.g., the user's own seat, a seat in a meeting room, and a seat in an in-house cafeteria) used by the user within the company (within the office) that the user works for, and a control mode with an identification name "Office" may be associated with each of the pieces of acquired distribution characteristics data. In the control mode "Office", the user terminal 200 provides the user with, for example, functions or data equivalent to functions (applications, devices such as a printer on an in-house network, or individual functions or services provided by the applications or devices) or data that the company's security policy permits users logging in the in-house network to use. In this mode, by using the user terminal 200, the user is also able to gain access (e.g., open a file) to those data for which the user is permitted access by the company's security policy or the user's access rights, among various data within the user terminal 200 and on the in-house network. The control mode "Office" is associated with definition data defining such behavior of the user terminal 200. In the example illustrated in FIG. 5, the distribution characteristics data obtained when the user sits in the user's own seat in an office, and the distribution characteristics data obtained when the user sits in a seat in a meeting room are respectively registered with identification names "Characteristics A" and "Characteristics B", and the control mode "Office" is associated with each of these pieces of distribution characteristics data. If a pair of pressure distributions on both the front and back sides acquired from the sheet-shaped apparatus 100 does not match any distribution characteristics data associated with the control mode "Office", then the user is unable to use some of the functions or information that the user is permitted to use in the "Office" mode.

In another example, distribution characteristics data may be acquired for seats located in places outside of the user's company, such as a cafe and a library, and a control mode having an identification name "Outside" may be associated with each of the pieces of acquired distribution characteristics data. In the control mode "Outside", for example, the user terminal 200 permits user's use of functions or data for which the company's security policy grants usage permission to users who are present outside the company. Which function or data is permitted for use is described in mode definition data associated with the control mode "Outside". In the "Outside" mode, the user is not permitted to use a specific business-related application that is available to the user in the "Office" mode, or to access a specific piece of data that is available to the user in the "Office" mode. In the example illustrated in FIG. 5, for example, the distribution characteristics data acquired when the user sits in a sofa in a cafe frequently visited by the user is registered with an identification name "Characteristics C", and the control mode "Outside" is registered in association with the distribution characteristics data.

Although FIG. 5 illustrates an example with two types of control modes, "Office" and "Outside", there may be three or more types of control modes, of course. For example, within the same office or same company, different control modes may be defined for different places. For example, a control mode defined for the user's own seat may be different from a control mode defined for a seat in an in-house cafeteria. Likewise, for places outside of the company, for example, a control mode defined for a chair in the user's own house may differ from a control mode defined for a seat in a public area. For each control mode, the range of functions or data on the user terminal 200 or on a network that the user is permitted to use, and the behavior of the sheet-shaped apparatus 100 (e.g., which sensor's sensing data is to be transmitted externally) are specified.

If a pair of pressure distributions obtained from the sheet-shaped apparatus 100 matches none of distribution characteristics data specified in the mode settings information, the user terminal 200 may execute control in a special mode. In one example, this special mode restricts the functions or data available to the user in comparison to any other control mode associated with each distribution characteristics data specified in the mode settings information. For example, this special mode may be a mode such that any operation from the user is not accepted (e.g., the display of the user terminal 200 is displaying a lock screen).

Although the foregoing description is directed to switching the behaviors of the user terminal 200 in accordance with the pair of pressure distributions on both the front and back sides of the sheet-shaped apparatus 100, the same method may be used to switch the behaviors of the sheet-shaped apparatus 100. For example, which sensor's sensing data among various sensors equipped to the sheet-shaped apparatus 100, or which analysis result obtained by the controller 110 through analysis based on sensing data from those sensors is to be sent to the user terminal 200 or to a predetermined server on a network that manages information about the sheet-shaped apparatus 100 may be switched between the "Office" mode and the "Outside" mode.

Next, an exemplary procedure executed by the system according to the exemplary embodiment will be described with reference to FIGS. 6 to 8. The following describes an exemplary case in which the sheet-linked program 204 of the user terminal 200 is responsible for the execution of a major control process such as control mode determination.

Figure 6:
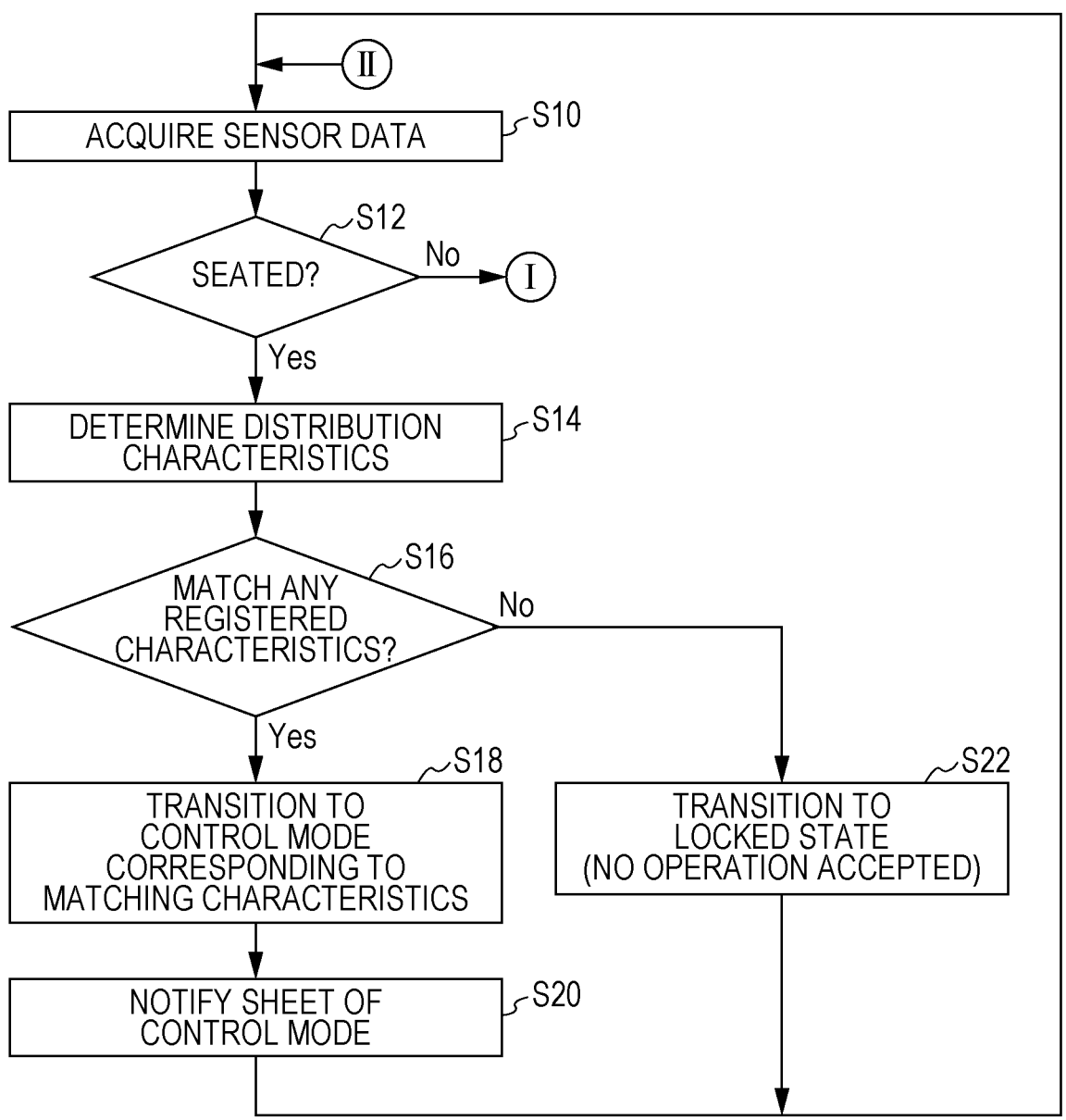
FIG. 6 illustrates an exemplary control to switch control modes based on information sensed by a sheet-shaped apparatus.

First, as illustrated in FIG. 6, the sheet-linked program 204 acquires sensor data transmitted from the sheet-shaped apparatus 100 at regular time intervals, for example (S10). The sensor data includes a pair of pressure distributions sensed by the pressure distribution sensors 102a and 102b, or distribution characteristics data obtained from the pair of pressure distributions. Next, the sheet-linked program 204 determines, from the sensor data, whether the user is seated (S12). For example, the user is determined to be seated if the integral of pressure distributions included in the sensor data is greater than or equal to a threshold that is set in accordance with the user's weight (or typical human weight). Otherwise, the user is determined to be not seated.

If the user is determined to be seated at S12, the sheet-linked program 204 determines, from the pair of pressure distributions in the sensor data, distribution characteristics data representing the pair of pressure distributions (S14). Step S14 may not be provided for configurations in which the sheet-linked program 204 receives not a pair of pressure distributions but distribution characteristics data from the sheet-shaped apparatus 100. The sheet-linked program 204 then determines whether there is any piece of distribution characteristics data registered in the mode settings information (see FIG. 5) that matches the distribution characteristics data represented by the currently acquired sensor data (S16). Whether the acquired distribution characteristics data matches a given piece of distribution characteristics data registered in the mode settings information may be determined by determining, for example, whether the former data falls within a range specified by the latter data, or whether the similarity between the former data and the latter data is less than or equal to a predetermined threshold.

If any distribution characteristics data matching the acquired distribution characteristics data is found at S16 (the result of the determination at S16 is Yes), the sheet-linked program 204 determines a control mode associated with the found distribution characteristics data, and controls the user terminal 200 in the determined control mode (S18). For example, the sheet-linked program 204 accepts an operation from the user if the operation is permitted in the control mode, and otherwise does not accept the operation. For example, if the control mode corresponding to the found registered distribution characteristics data is the "Outside" mode, the sheet-linked program 204 does not permit activation of software that the user is permitted to use only in the "Office" mode, and does not accept an operation for opening an electronic document that is set to be viewable in the "Office" mode but not viewable in the "Outside" mode. To minimize unwanted leakage of internal company data, the sheet-linked program 204 may be set up such that in the "Outside" mode, even when the sheet-linked program 204 receives an instruction to print a specific electronic document, the sheet-linked program 204 does not permit such printing. For example, the usage rights (such as the rights to view, edit, and print) that the user has for an electronic document in each individual control mode may be specified in the attribute data of the electronic document in advance. Likewise, for each device on a network, the usage rights that the user has for the device in each individual control mode may be managed in association with the device (e.g., such associations are managed on a server), and a request to use the device made from the user may be controlled in accordance with the user's rights corresponding to the control mode determined at S18. When the user enters into the user terminal 200 a request for access to an electronic document or service residing on a server on a network, the sheet-linked program 204 may inform the server of the current control mode, and the server may determine whether the electronic document or service that the user has requested for is permitted for the user to access in the current control mode, and provide the electronic document or service to the user only if it is determined that the user is permitted to access the electronic document or service.

The sheet-linked program 204 may provide notification of the control mode determined at S18 to the controller 110 of the sheet-shaped apparatus 100 (S20). Upon receiving the notification, the controller 110 controls each unit within the sheet-shaped apparatus 100 to operate in accordance with the control mode.

If no registered distribution characteristics data matching the distribution characteristics data determined at S14 is found from the mode settings information at S16, the sheet-linked program 204 causes the user terminal 200 to transition to a locked state (S22). A locked state refers to a state in which normal operations from the user are not accepted. In locked state, the user terminal 200 switches the previously displayed screen to a lock screen. The lock screen displays information such as a description indicating that the user terminal 200 is currently in locked state, and guidance information describing how to cancel the locked state. This guidance information includes, for example, a description indicating that the locked state is not cancelled unless the correct user sits on the sheet-shaped apparatus 100 in a correct manner. While the lock screen is displayed, the user terminal 200 does not accept any operation except an operation for cancelling the locked state.

If it is determined at S12 that the user is not seated, this means that the user has stepped away or is away from his or her seat. In this case, as illustrated in FIG. 7, the sheet-linked program 204 determines whether counting of an away-time, which represents the amount of time the user is away from his or her seat, is being currently executed (S30). If counting of the away-time is not being executed, the counting is started (S32). If it is determined at S30 that the away-time is being counted, the sheet-linked program 204 determines whether a counter counting the away-time is indicating a value (i.e., away-time) exceeding a predetermined threshold (S34). This threshold represents a hold time allowed before the user terminal 200 transitions to the locked state (S50 in FIG. 8) after the user steps away from the seat on which the sheet-shaped apparatus 100 is placed (with the sheet-shaped apparatus 100 located in front of this seat). For example, if the user terminal 200 in front of the user's seat is locked immediately when the user steps away from the seat for a chore that can be finished quickly, the user has to take the trouble of performing an unlock operation upon returning to the seat. Accordingly, in the example illustrated in FIG. 7, the transition to the locked state does not occur until the time elapsed after the user steps away from the seat reaches a threshold (hold time).

It is not desirable, however, for someone else other than the user to operate the user terminal 200 during the time from when the user steps away from the seat until the user terminal 200 transitions to the locked state. Accordingly, with the control process illustrated in FIG. 7, if someone else other than the user sits in the seat before a transition to the locked state occurs, such an event is sensed, and operation of the user terminal 200 is disabled.

That is, if the result of the determination at S34 is No, the sheet-linked program 204 acquires sensor data from the sheet-shaped apparatus 100 (S36), and from the acquired sensor data, the sheet-linked program 204 determines, in the same manner as at S12, whether someone is seated (S38). If no one is seated, the sheet-linked program 204 increments the value of the away-time counter by a predetermined amount, and returns to S34. If it is determined at S38 that someone is seated, the sheet-linked program 204 obtains distribution characteristics data from the sensor data in the same manner as at S14 (S40), and determines whether the obtained distribution characteristics data matches any registered distribution characteristics data included in the mode settings information (S42). In the determination at S42, rather than checking all pieces of registered distribution characteristics data included in the mode settings information, the sheet-linked program 204 may only determine whether the distribution characteristics data obtained at S40 matches the registered distribution characteristics data previously determined at S16 prior to the user leaving the seat.

If the result of the determination at S42 is Yes, this means that the very user who has stepped away from the seat is now back in the seat. In this case, the sheet-linked program 204 stops the counting of the away-time (S44), and returns to S10 in FIG. 6. If the result of the determination at S42 is No, this means that someone else other than the very user who has stepped away from the seat is now seated in the seat. In this case, the sheet-linked program 204 proceeds to S50 (see FIG. 8), and causes the user terminal 200 to transition to the locked state.

In this regard, the sheet-linked program 204 proceeds to S50 and causes the user terminal 200 to transition to the locked state also if it is determined at S34 that the count value of the away-time has exceeded a threshold.

Figure 8:
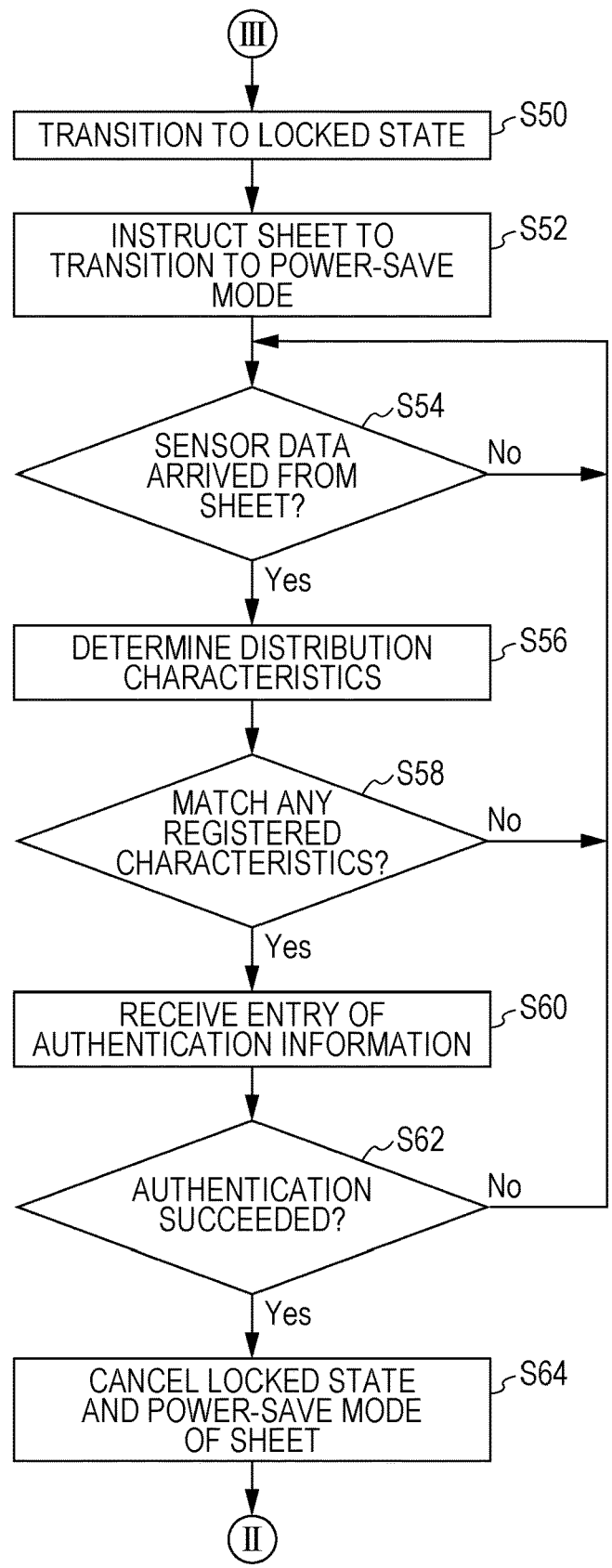
FIG. 8 illustrates an exemplary control to switch control modes based on information sensed by a sheet-shaped apparatus.

In the example illustrated in FIG. 8, after causing the user terminal 200 to transition to the locked state at S50, the sheet-linked program 204 transmits an instruction to transition to a power-save mode (S52) to the sheet-shaped apparatus 100. Upon receiving the instruction, the controller 110 of the sheet-shaped apparatus 100 causes the operation mode to transition from normal mode to power-save mode. In the power-save mode, supply of power to sensors or other units within the sheet-shaped apparatus 100 is stopped, except for those sensors or units specified to be operated also in the power-save mode. The power-save mode allows operation of the pressure distribution sensors 102a and 102b but stops power supply to, for example, components such as the heater 104 and a temperature sensor. Further, the power-save mode allows operation of the controller 110 or the communication unit 112 but places restrictions such as limiting the processes executed by the controller 110 or permitting data transmission from the communication unit 112 to the user terminal 200 or other apparatuses only when a special event occurs. In the example illustrated in FIG. 8, if the integral of pressure distributions sensed by the pressure distribution sensors 102a and 102b becomes greater than or equal to a threshold determined in accordance with human weight (i.e., if someone is determined to have sat on the sheet-shaped apparatus 100), the controller 110 transmits sensor data including the pair of these pressure distributions (or distribution characteristics data obtained from the pair of pressure distributions) to the user terminal 200. Conversely, if the integral of the pressure distributions being sensed by the pressure distribution sensors 102a and 102b is less than the threshold, the controller 110 does not determine that a human person has sat on the sheet-shaped apparatus 100, and does not transmit sensor data to the user terminal 200.

When the user terminal 200 is in locked state, the sheet-linked program 204 waits for the arrival of sensor data from the sheet-shaped apparatus 100 (S54). Upon arrival of sensor data, the sheet-linked program 204 obtains distribution characteristics data from the sensor data in the same manner as at S14 (S56), and determines whether the obtained distribution characteristics data matches any registered distribution characteristics data included in the mode settings information (S58). In the determination at S58, the sheet-linked program 204 may only determine whether the distribution characteristics data obtained at S40 matches the registered distribution characteristics data previously determined at S16 prior to the user leaving the seat. If the result of the determination at S58 is No, this means that the person sitting on the sheet-shaped apparatus 100 at that time is different from the very user who has stepped away from the seat. In this case, the sheet-linked program 204 does not cancel the locked state, and returns to S54.

If the result of the determination at S58 is Yes, it can be assumed that the very user who has stepped away from the seat is now back in the seat. Although the locked state of the user terminal 200 may be immediately cancelled in this case, for enhanced security, the user is asked to enter authentication information in the example illustrated in FIG. (S60). The authentication information to be entered by the user at this time may be the same authentication information (e.g., password) that the user enters when logging into the user terminal 200. Upon entry of the authentication information, the operating system of the user terminal 200 determines whether the authentication information is correct (S62). If the authentication information is incorrect, it is not allowed to cancel the locked state, and the process returns to S54. If the authentication information is correct, the locked state is cancelled, and the screen previously displayed prior to the transition to the locked state is displayed on the user terminal 200 (S64). Further, the sheet-linked program 204 instructs the sheet-shaped apparatus 100 to return from the power-save mode to the normal mode (S64). In response to this instruction, the sheet-shaped apparatus 100 returns to the normal mode. Thereafter, the process returns to S10 illustrated in FIG. 6.

After the sheet-shaped apparatus 100 transitions to the power-save mode, if a predetermined time elapses without the sheet-shaped apparatus 100 returning to the normal mode, the sheet-shaped apparatus 100 may be powered off. In another example, the power-save mode may not be provided, and the sheet-shaped apparatus 100 may be powered off at the time corresponding to S52. If the sheet-shaped apparatus 100 is in power-off state when the user sits on the sheet-shaped apparatus 100 upon returning to the seat, no pressure distribution or distribution characteristics data is sent from the sheet-shaped apparatus 100 to the user terminal 200 at this time, and hence the unlock condition is not satisfied on the side of the user terminal 200. In this case, the user turns on the power to the sheet-shaped apparatus 100 so that data such as pressure distribution data is transmitted to the user terminal 200.

Figure 7:
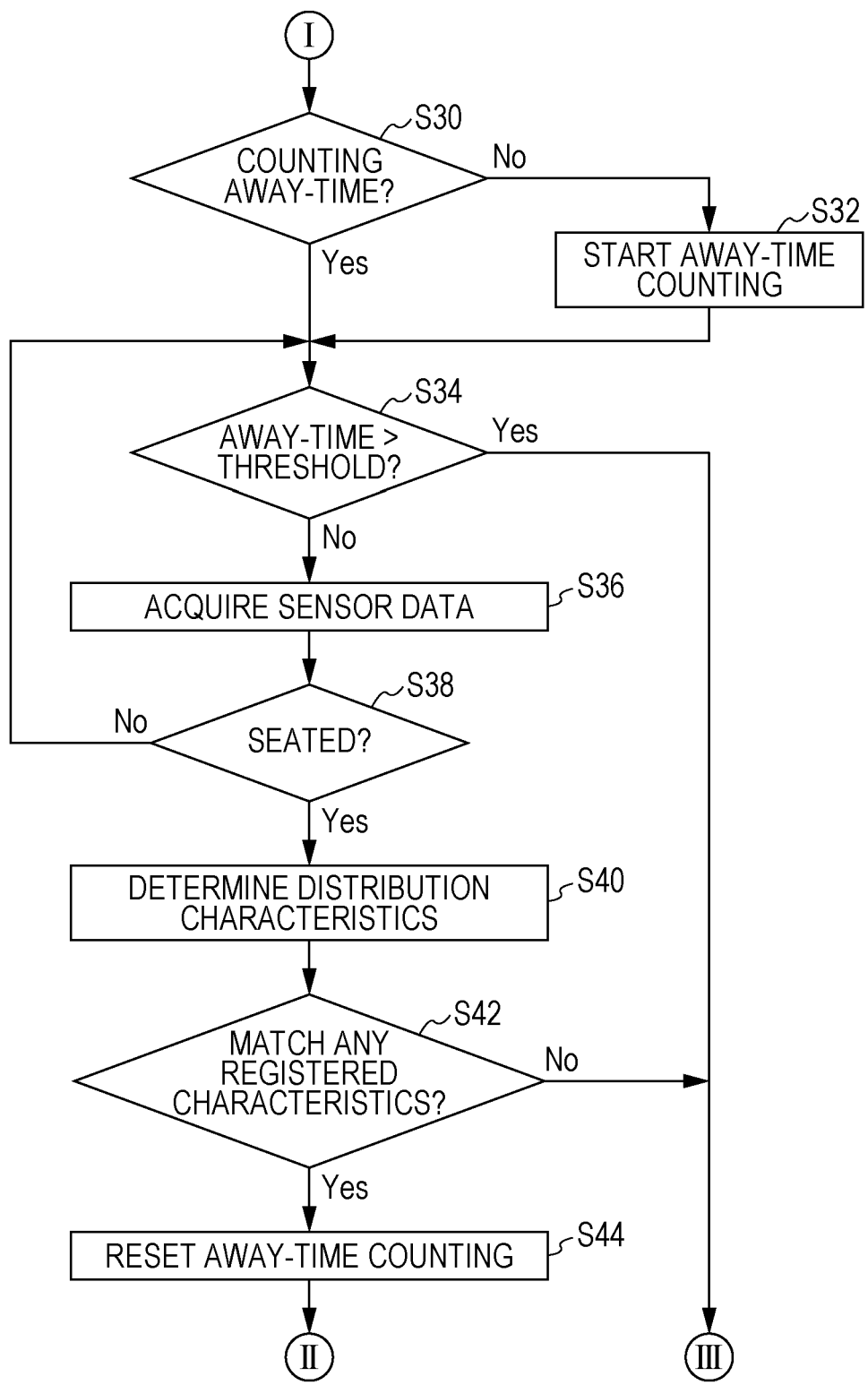
FIG. 7 illustrates an exemplary control to switch control modes based on information sensed by a sheet-shaped apparatus.

Although the sheet-linked program 204 of the user terminal 200 is responsible for the execution of a major control process such as control mode determination in the procedure illustrated in FIGS. 6 to 8, this is intended to be illustrative only. Instead, the controller 110 of the sheet-shaped apparatus 100 may execute the same control process as that illustrated in FIGS. 6 to 8. In this case, the controller 110 possesses the mode settings information (FIG. 5). The controller 110 provides notification of a control mode determined from a pair of pressure distributions (S18) to the sheet-linked program 204 of the user terminal 200 (S20), and the sheet-linked program 204 switches the control modes for the user terminal 200 in response to this notification. In another example, the same control process (in particular, the control mode determination) as that illustrated in FIGS. 6 to 8 may be executed by a server or cloud on the network that is accessible from the sheet-shaped apparatus 100 and from the user terminal 200. In this case, the server or cloud provides notification of a determined control mode to the user terminal 200 and the sheet-shaped apparatus 100, and each of the user terminal 200 and the sheet-shaped apparatus 100 change its own mode in accordance with the notification.

In the above-mentioned example, the requisite condition for granting the user access to the user terminal 200 may be set by the user terminal 200 as transmission, from the sheet-shaped apparatus 100 located nearby, of a pair of pressure distributions or distribution characteristics data that matches registered distribution characteristics data registered within the user terminal 200. In other words, the sheet-shaped apparatus 100 is used as one element used in two- or multi-element authentication required for logging into the user terminal 200 or other apparatuses. In this case, the user is allowed to log into the user terminal 200 only after the following condition is met: the user places the sheet-shaped apparatus 100 on a seat for which distribution characteristics data is previously registered, sits on the seat, and then enters correct authentication information (e.g., a user ID or password) into the user terminal 200 located in front of the seat. If a third person who has gained knowledge of the user's authentication information attempts to log into the user terminal 200 by using the authentication information, the login attempt fails because the pair of pressure distributions obtained from the sheet-shaped apparatus 100 at this time differs from the pair of pressure distributions that would be obtained for a legitimate user. If the user carries the sheet-shaped apparatus 100 with him or her when leaving the seat, this means that the user terminal 200 located in front of the seat does not obtain any pressure distribution information from the sheet-shaped apparatus 100 in this case. Accordingly, even if a third person enters correct authentication information while the user is away from the seat, the third person is not allowed to login.

In the above-mentioned example, the controller 110 may control the heater 104 in accordance with the determined control mode. For example, the controller 110 may switch the On/Off or temperature settings between the Office mode and the Outside mode.

Although the foregoing description is directed to an example in which the sheet-shaped apparatus 100 is in the form of a cushion placed on the seating surface of a seat, the sheet-shaped apparatus 100 may not necessarily be in the form of a cushion. For example, the sheet-shaped apparatus 100 may be a larger-sized, thin apparatus that can be also wrapped around the user's body like a lap robe when in use, for example.

Figure 9:
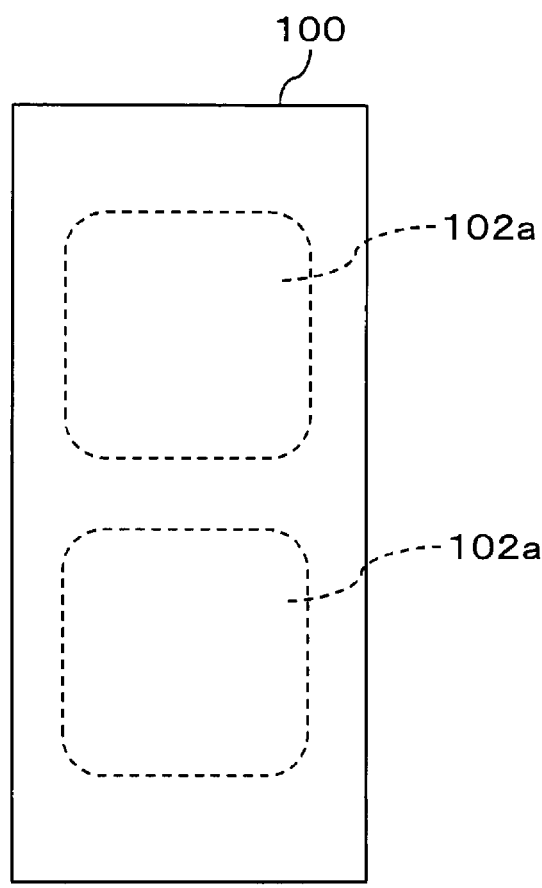
FIG. 9 schematically illustrates the top face configuration of a sheet-shaped apparatus that is placed over the area from the seating surface to the backrest.
Figure 10:
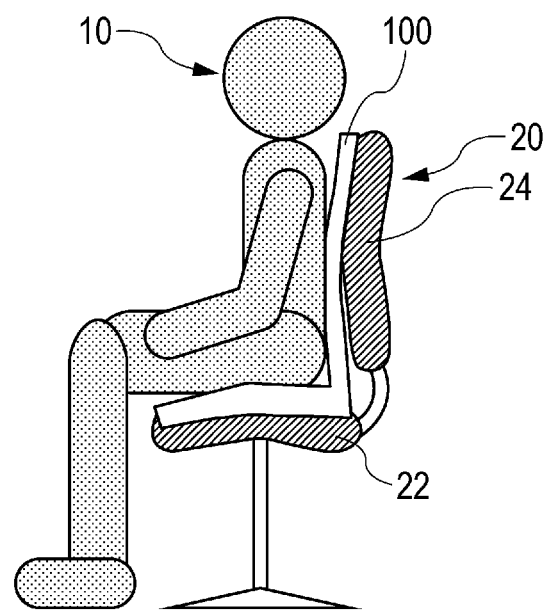
FIG. 10 schematically illustrates the sheet-shaped apparatus illustrated in FIG. 9 in use.

FIGS. 9 and 10 each illustrate such a larger-sized, thin sheet-shaped apparatus 100. The sheet-shaped apparatus 100 is, for example, a rectangular, relatively thin apparatus having a width approximately equal to the lateral width of a human person and a length approximately equal to the length from the neck or shoulders to the thighs of a human person. The term "relatively thin" as used herein means that the sheet-shaped apparatus 100 is of a thickness that allows the sheet-shaped apparatus 100 to be rolled or folded up for carrying. When in use, the sheet-shaped apparatus 100 is placed over the area of a chair 20 from a seating portion 22 to a backrest 24 as illustrated in FIG. 10. In FIG. 10, the sheet-shaped apparatus 100 is depicted thicker than in reality for easy recognition.

Although not illustrated, like the sheet-shaped apparatus 100 in the form of a cushion illustrated in FIGS. 1 and 2, the sheet-shaped apparatus 100 in the present example is also made up of the body portion 120 and a covering that covers the body portion 120. As described above, the body portion 120 is formed by the base 122 equipped with various sensors, such as the pressure distribution sensors 102a and 102b on both the front and back sides of the base 122, a heater, and other electrical equipment, and the cover is made of, for example, a fabric or weave of natural fibers, such as wool, chemical fibers, or other fibers. The thin, sheet-shaped apparatus 100 in the present example has the base 122 that, although thinner than the base of the above-mentioned sheet-shaped apparatus 100 implemented as a cushion, serves as a cushioning material between the pressure distribution sensors 102a and 102b placed on both the front and back sides of the sheet-shaped apparatus 100. Consequently, different pressure distributions are sensed by these two sensors.

Since the sheet-shaped apparatus 100 in the present example is comparatively long, as illustrated in FIG. 10, the sheet-shaped apparatus 100 is placed such that approximately half of the sheet-shaped apparatus 100 is located on the seating surface of the seat, with the remaining approximately half of the sheet-shaped apparatus 100 resting against the backrest surface. Both the upper half and lower half of the sheet-shaped apparatus 100 may be provided with a pair of pressure distribution sensors 102a and 102b on their front and back sides so that whichever half of the sheet-shaped apparatus 100 may be placed on the seating surface.

When the user places the thin, sheet-shaped apparatus 100 over the area of the seat from the seating surface to the backrest and sits on the sheet-shaped apparatus 100, two pairs of pressure distributions on both the front and back sides of the sheet-shaped apparatus 100 are obtained from the pair of pressure distribution sensors located on the seating surface and the pair of pressure distribution sensors located on the backrest. Of these pressure distributions, the pressure distributions on the seat side represent pressures that are noticeably greater than the pressures represented by the pressure distributions on the backrest side. This makes it possible to determine which pair of pressure distributions corresponds to the pair of pressure distributions on the seat side. By using the pair of pressure distributions on the seat side, it is possible to switch control modes in the same manner as when the above-mentioned sheet-shaped apparatus 100 in the form of a cushion is used.

When in use, the thin, sheet-shaped apparatus 100 in the present example can be not only placed on a seat but also wrapped around the body of a seated user like a lap robe for purposes such as cold protection. For example, when the sheet-shaped apparatus 100 is being used while wrapped around the user's body like a lap robe, the pair of pressure distributions obtained at this time differs from the pair of pressure distributions that would be obtained when the sheet-shaped apparatus 100 is used while placed on the seat. For example, when the sheet-shaped apparatus 100 is being used as a lap robe, the pressure sensed by the pressure distribution sensor 102 disposed on the top side of the sheet-shaped apparatus 100 is substantially zero. By contrast, the pressure sensed at this time by the pressure distribution sensor 102 on the underside of the sheet-shaped apparatus 100 is generally due to the self-weight of the sheet-shaped apparatus 100. Accordingly, a pressure with a magnitude corresponding to this self-weight is sensed as being exerted on a portion of the sheet-shaped apparatus 100 that is in contact with the area from the user's knees to the thighs. Such a pair of pressure distributions is clearly distinguishable from the pair of pressure distributions that would be obtained when the sheet-shaped apparatus 100 is used while placed on a seat.

Accordingly, if a pair of pressure distributions on both the front and back sides sensed by the sheet-shaped apparatus 100 is indicative of distribution characteristics obtained when the sheet-shaped apparatus 100 is used as a lap robe, the controller 110 may use a control mode different from the control mode that would be used when the sheet-shaped apparatus 100 is used while placed on a seat. For example, if it is determined that the sheet-shaped apparatus 100 is being used as a lap robe, the user is likely to be feeling cold at his or her feet. Accordingly, the temperature setting of the heater 104 may be raised in comparison to when the sheet-shaped apparatus 100 is used while placed on a seat. Unlike when the sheet-shaped apparatus 100 is used while placed on a seat, when the sheet-shaped apparatus 100 is being used while wrapped around the user's body like, for example, a lap robe, the pair of pressure distributions obtained from the pressure distribution sensors 102 on the front and back sides at this time does not exhibit distribution characteristics unique to a user-seat combination. Consequently, it is not possible to use such a pair of pressure distributions as one element used for user authentication. In this case, to enable multi-element authentication, the sheet-linked program 204 of the user terminal 200 may ask the user to present authentication information derived from another element (e.g., another object possessed by the user, for example, a smart phone or a hardware token).

The exemplary embodiment of the invention has been described above. As described above, according to the exemplary embodiment, a pair of pressure distributions on both sides of the sheet-shaped apparatus 100 is used as representative of distribution characteristics unique to a user-seat combination, and the distribution characteristics are used in controlling the sheet-shaped apparatus 100 or the user terminal 200 that communicates with the sheet-shaped apparatus 100. Examples of such controls include switching the control modes for the user terminal 200 or the sheet-shaped apparatus 100 when the user sits in a different seat, and using the distribution characteristics as one element of multi-element user authentication.

Although the foregoing description is directed to an example in which the user terminal 200 serves as a controlled object other than the sheet-shaped apparatus 100, this is not intended to be limitative. Other devices capable of receiving distribution characteristics based on a pair of pressure distributions obtained by the sheet-shaped apparatus 100 may be controlled in the same manner as mentioned above.

Although the foregoing description is directed to an example in which the pressure distribution sensors 102a and 102b that are sheet-shaped are used to obtain pressure distributions on both the front and back sides of the sheet-shaped apparatus 100, instead of these pressure distribution sensors, multiple load sensors may be deployed in a predetermined pattern on each of the front and back sides of the sheet-shaped apparatus 100, and a set of load values sensed by the multiple load sensors may be used as representative of pressure distribution.

A distribution of other physical quantities may be used instead of pressure distribution. For example, distribution characteristics for identifying a user-seat combination may be obtained from a pair of temperature distributions on both the front and back sides of the sheet-shaped apparatus 100. In another example, each of the front and back sides of the sheet-shaped apparatus 100 may be provided with a sheet-shaped sensor used for obtaining an electrostatic capacitance distribution or a set of multiple electrostatic capacitance sensors, and a pair of electrostatic capacitance distributions on both the front and back sides of the sheet-shaped apparatus 100 obtained from each sensor or each set of sensors may be used as representative of distribution characteristics unique to a user-seat combination.

Although the foregoing description is directed to an example in which a sensing unit (e.g., a pressure distribution sensor) that senses a physical quantity is disposed on each of two sides of the sheet-shaped apparatus 100, a single sensor capable of sensing a physical quantity acting on each of the two sides individually may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
   a portable device comprising a planar sheet having a first face and a second face, the second face being disposed on an opposite side of the planar sheet from the first face;
   a sensing unit comprising at least two sensors, a first sensor of the at least two sensors sensing a physical quantity acting on the first face and a second sensor of the at least two sensors sensing a physical quantity acting on the second face;
   a controller that executes a control based on a combination of physical quantities, the combination of physical quantities being a combination of the sensed physical quantity acting on the first face and the sensed physical quantity acting on the second face; and
   a memory that stores registered distribution characteristics and a control mode corresponding to the registered distribution characteristics, the registered distribution characteristics being determined for each combination of the user and the seat and indicative of a combination of the first distribution and the second distribution sensed when the user is sitting on the sheet placed on the seat,
   wherein the sensing unit senses a first distribution and a second distribution, the first distribution being a distribution of the physical quantity acting on the first face, the second distribution being a distribution of the physical quantity acting on the second face, and
   wherein the controller executes a control based on a combination of the first distribution and the second distribution,
   wherein the combination of the first distribution and the second distribution comprises a combination of the physical quantity acting on the first face and the physical quantity acting on the second face that are exerted from a seat and from a user sitting on the sheet placed on the seat,
   wherein if registered distribution characteristics matching a combination of the first distribution and the second distribution on the sheet that are being sensed by the sensing unit are stored in the memory, the controller executes a control according to the control mode corresponding to the matching registered distribution characteristics,
   wherein the control mode comprises a first control mode, and
   wherein in response to sensing of a first combination of the first distribution and the second distribution by the sensing unit while a device to be controlled is controlled in the first control mode, the controller executes a control that restricts use of the device, unless a second combination of the first distribution and the second distribution is sensed before a predetermined time elapses after the sensing of the first combination, the first combination being a combination of the first distribution and the second distribution that is indicative of the user leaving the seat, the second combination being a combination of the first distribution and the second distribution that matches the registered distribution characteristics corresponding to the first control mode,
   wherein in response to sensing of a third combination of the first distribution and the second distribution by the sensing unit before the predetermined time elapses after the sensing of the first combination by the sensing unit, the controller executes the control that restricts use of the device without waiting for the predetermined time to elapse, the third combination being a combination of the first distribution and the second distribution that indicates resting of an object on the sheet placed on the seat but does not match the registered distribution characteristics corresponding to the first control mode.

2. The information processing system according to claim 1,
   wherein if the combination of the first distribution and the second distribution does not match a predetermined combination, the controller executes a control that restricts a function or information to be provided to the user.

3. The information processing system according to claim 2,
   wherein if the combination of the first distribution and the second distribution does not match a predetermined combination, the controller controls a device communicating with the sheet not to accept an operation from the user.

4. The information processing system according to claim 1,
   wherein if the combination of the first distribution and the second distribution does not match a predetermined combination, the controller restricts a function or information to be provided to a user via a device communicating with the sheet, in comparison to if the combination of the first distribution and the second distribution matches the predetermined combination.

5. The information processing system according to claim 1,
   wherein the controller executes a control to provide a function or information associated with the combination of the first distribution and the second distribution.

6. The information processing system according to claim 1,
wherein the controller executes a control to disable provision of a function or information not associated with the combination of the first distribution and the second distribution.

7. The information processing system according to claim 1, wherein the controller determines whether a user providing the sensed physical quantity acting on the first face and the sensed physical quantity acting on the second face is in a predetermined first location or is not in the predetermined first location.

8. The information processing system according to claim 7, wherein the controller determines whether the user providing the sensed physical quantity acting on the first face and the sensed physical quantity acting on the second face is in an office setting or is in a location outside of the office setting.

9. An information processing system comprising:
a portable device comprising a planar sheet having a first face and a second face, the second face being disposed on an opposite side of the planar sheet from the first face;
sensing means for sensing a physical quantity acting on the first face and a physical quantity acting on the second face;
controller means for executing a control based on a combination of physical quantities, the combination of physical quantities being a combination of the sensed physical quantity acting on the first face and the sensed physical quantity acting on the second face; and
storing means for storing registered distribution characteristics and a control mode corresponding to the registered distribution characteristics, the registered distribution characteristics being determined for each combination of the user and the seat and indicative of a combination of the first distribution and the second distribution sensed when the user is sitting on the sheet placed on the seat,
wherein the sensing means senses a first distribution and a second distribution, the first distribution being a distribution of the physical quantity acting on the first face, the second distribution being a distribution of the physical quantity acting on the second face, and
wherein the controller means executes a control based on a combination of the first distribution and the second distribution,
wherein the combination of the first distribution and the second distribution comprises a combination of the physical quantity acting on the first face and the physical quantity acting on the second face that are exerted from a seat and from a user sitting on the sheet placed on the seat,
wherein if registered distribution characteristics matching a combination of the first distribution and the second distribution on the sheet that are being sensed by the sensing unit are stored in the storing means, the controller means executes a control according to the control mode corresponding to the matching registered distribution characteristics,
wherein the control mode comprises a first control mode, and
wherein in response to sensing of a first combination of the first distribution and the second distribution by the sensing unit while a device to be controlled is controlled in the first control mode, the controller means executes a control that restricts use of the device, unless a second combination of the first distribution and the second distribution is sensed before a predetermined time elapses after the sensing of the first combination, the first combination being a combination of the first distribution and the second distribution that is indicative of the user leaving the seat, the second combination being a combination of the first distribution and the second distribution that matches the registered distribution characteristics corresponding to the first control mode,
wherein in response to sensing of a third combination of the first distribution and the second distribution by the sensing means before the predetermined time elapses after the sensing of the first combination by the sensing means, the controller means executes the control that restricts use of the device without waiting for the predetermined time to elapse, the third combination being a combination of the first distribution and the second distribution that indicates resting of an object on the sheet placed on the seat but does not match the registered distribution characteristics corresponding to the first control mode.

* * * * *